United States Patent [19]

Whittaker

[11] Patent Number: 5,826,103
[45] Date of Patent: Oct. 20, 1998

[54] SYSTEM FOR STORING PHYSICAL LOCATIONS OF ALL PORTS SPECIFIED IN TERMS OF PORT LOCATIONS RELATIVE TO PARAMETERS OF A PREDETERMINED CONFIGURATION WITHIN DATA PROCESSING SYSTEM

[75] Inventor: Martin John Whittaker, Cupertino, Calif.

[73] Assignee: Hewlett-Packard Company, Palo Alto, Calif.

[21] Appl. No.: 754,466

[22] Filed: Nov. 22, 1996

Related U.S. Application Data

[63] Continuation of Ser. No. 177,582, Jan. 5, 1994, abandoned.

[51] Int. Cl.⁶ ............................. G06F 15/40; G06F 11/30
[52] U.S. Cl. ..................... 395/828; 395/500; 395/200.5
[58] Field of Search ................................ 395/200.5, 828, 395/800, 500

[56] References Cited

U.S. PATENT DOCUMENTS

| | | | |
|---|---|---|---|
| 4,486,827 | 12/1984 | Shima et al. ........................... | 364/200 |
| 4,982,324 | 1/1991 | McConaughy et al. ................ | 364/200 |
| 5,038,320 | 8/1991 | Heath et al. ............................ | 364/900 |
| 5,121,500 | 6/1992 | Arlington et al. ...................... | 395/750 |
| 5,226,120 | 7/1993 | Brown et al. .......................... | 395/200 |
| 5,247,682 | 9/1993 | Kondou et al. ........................ | 395/700 |
| 5,257,387 | 10/1993 | Richek et al. ......................... | 395/800 |
| 5,329,634 | 7/1994 | Thompson ............................. | 395/500 |
| 5,386,567 | 1/1995 | Lien et al. ............................. | 395/700 |
| 5,437,019 | 7/1995 | Brockmann ........................... | 395/400 |
| 5,444,642 | 8/1995 | Montgomery et al. ................ | 364/550 |
| 5,586,254 | 12/1996 | Kondo et al. ........................ | 395/200.1 |

*Primary Examiner*—Thomas C. Lee
*Assistant Examiner*—Rehana Perveen

[57] ABSTRACT

A data processing system having a central processing unit for executing instructions stored in a memory, a plurality of peripheral ports at a plurality of physical locations, and a routing network for coupling the central processing unit to the peripheral ports. The routing network has a network storage device for storing information relating to the physical locations of the ports, and a controller responsive to a command for reporting such information. Peripherals used in the data processing system preferably have a peripheral storage device for storing information relating to characteristics of the peripherals and a peripheral controller responsive to a command for reporting such information.

12 Claims, 2 Drawing Sheets

SYSTEM FOR STORING PHYSICAL LOCATIONS OF ALL PORTS SPECIFIED IN TERMS OF PORT LOCATIONS RELATIVE TO PARAMETERS OF A PREDETERMINED CONFIGURATION WITHIN DATA PROCESSING SYSTEM

CROSS REFERENCE TO RELATED APPLICATION(S)

This is a continuation of application Ser. No. 08/177,582 filed Jan. 5, 1994, now abandoned.

FIELD OF THE INVENTION

The present invention relates to data processing systems and, more particularly, to data processing systems having slots or ports for attaching peripherals that expand or add to the system capabilities.

BACKGROUND OF THE INVENTION

Modern data processing systems, or computers, are available in an increasingly wide range of types that vary in terms of size, shape, complexity, abilities, and applications. Most computers fall within certain broad categories, such as supercomputers, mainframes, superminicomputers, minicomputers, workstations, and personal computers. Even within each of these categories, however, computers vary widely in nearly all respects relating to hardware and software used, processing capabilities, and peripheral support capabilities. The complexity and variety of computers is continuing to increase and, in fact, the rate of technological innovation appears to be accelerating.

Due to accelerating technological innovation, it is more important than ever to provide computers with peripheral expansion slots or ports so that users can take advantage of innovative peripherals that expand or add to the capabilities of the computer. Installation and replacement of peripherals often requires familiarity with the different types of slots and peripherals available, and the types of slots appropriate for particular peripherals. Certain peripherals, for example, require more than one slot. Other peripherals may be used only with 8-bit slots, 16-bit slots, or other specific types of slots.

It is often desirable for the end user of a computer to be capable of adding and removing peripherals, such as expansion boards or cards, to accommodate the user's particular needs. Computer users, however, range in sophistication and technical abilities. It is, therefore, important for peripherals to be relatively easy to install and remove. To this end, it is desirable for many types of software, such as diagnostic software, to provide explicit instructions to the user that enable the user to perform the necessary tasks relating to the peripherals. One of the most "user-friendly" ways to provide such instructions would be to display to a user on a video monitor (or other output device) information helping the user to identify particular peripherals or slots.

To provide detailed instructions to the user concerning peripherals, computer software must be capable of mapping the logical elements of the computer, as seen by a central processing unit, to the arrangement of peripherals or slots within the computer. Due to the wide variety of computers available, however, the number and physical arrangement of peripheral slots vary widely among computers. The types and sizes of the peripherals themselves also vary widely. In some cases, for example, peripherals may occupy two or more slots. It is, therefore, difficult for producers of computer hardware components, peripherals, or software to know the physical structure of the peripherals or the computer in which the hardware components, peripherals, or software will be used. Thus, it is difficult for these producers to provide sufficiently detailed instructions to the user concerning the installation, removal, or troubleshooting of peripherals in any particular computer system.

One way to provide detailed information to the user is to provide software that is customized to a particular hardware platform such that it contains information about the hardware and physical structure of the system. Customizing software is difficult and expensive given the wide variety of hardware platforms and peripherals currently available. Custom software must also be updated to reflect any relevant changes in the hardware platform.

Another approach is to use conventional bus slot numbers or similar information that is not designed into the software. Instead, the information is written to the chassis of the computer and software references (but does not necessarily understand) the numbers. Such slot numbers normally correspond to the logical slot numbers that software uses. This approach, however, requires the user to understand more about the operation of the computer, and does not permit the software to give detailed instructions concerning the physical location and appearance of the peripherals.

Broadly, one object of the present invention is to provide a computer system in which software executing on the system can use information provided by the hardware and/or firmware of the components of the computer system to determine the physical arrangement of the components in the computer system and provide such information to the user.

Another object of the present invention is to enable a central processing unit of a data processing system to correlate or map the logical structure of the system to the physical structure of the system without the necessity of preprogramming the central processing unit with detailed information on the location of specific hardware components within the data processing system.

Still another object of the present invention is to allow for the use of generic software (that is, software not customized to a specific geometric configuration of hardware) that can correlate or map the logical structure of a data processing system to the physical structure of the system based on information retrieved from hardware components of the system.

Yet another object of the present invention is to eliminate the need for customizing software by specifying in advance the physical location of hardware components within a specific hardware platform for a data processing system.

A further object of the present invention is to enable generic software to display to a user on a video monitor information that will help the user to identify the location of a particular peripheral.

Yet a further object of the present invention is to enable software to identify to a user the physical location of a faulty input/output card that the user might want to replace. This is particularly important when cards are being removed and replaced while the computer is "on line."

A still further object of the present invention is to partition information relating to the physical characteristics of an input/output system for a computer and associate each piece of information with the hardware component that controls or determines the information.

These and other objects of the present invention will become apparent to those skilled in the art from the following detailed description of the invention, the accompanying drawings, and the appended claims.

SUMMARY OF THE INVENTION

The present invention comprises a data processing system having a central processing unit for executing instructions stored in a memory, a plurality of peripheral ports at a plurality of physical locations, and a routing network for coupling the central processing unit to the peripheral ports. The routing network comprises network storage means for storing location information relating to the physical locations of the ports and control means responsive to a location command for reporting the location information.

DETAILED DESCRIPTION OF THE INVENTION

Figure 1:
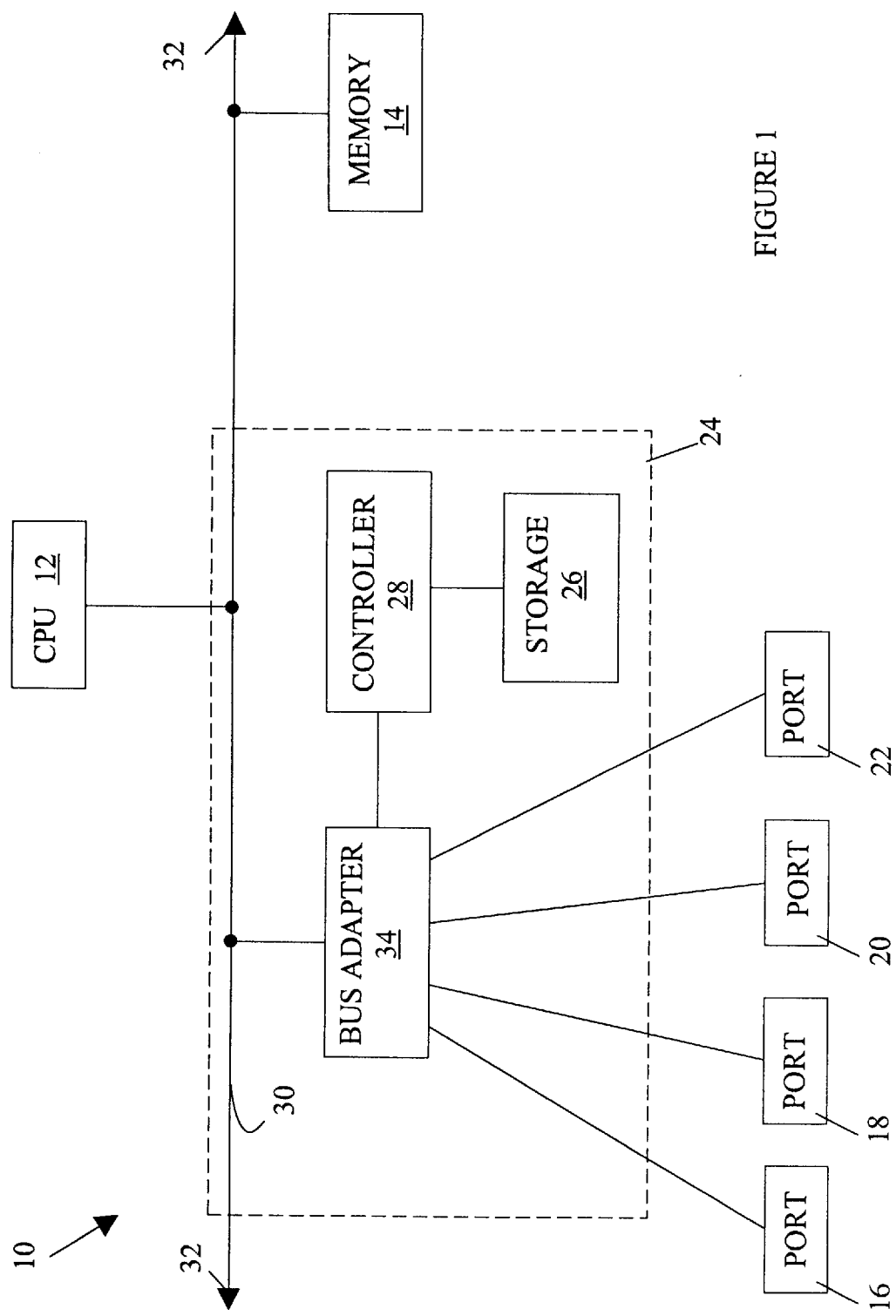
FIG. 1 is a block diagram showing the logical structure of an exemplary data processing system according to the present invention.

The logical structure of an exemplary data processing system according to the present invention is described below in reference to FIG. 1. Data processing system 10 according to the present invention comprises a central processing unit ("CPU") 12 for executing instructions stored in a memory 14, a plurality of peripheral ports 16 through 22, and a routing network 24 for coupling central processing unit 12 to peripheral ports 16 through 22. CPU 12 may be coupled to memory 14 directly or through routing network 24.

CPU 12 represents, generally, the computational and control unit of data processing system 10. The particular type of CPU used is not essential to the present invention. For example, CPU 12 may include one or more circuit boards having multiple integrated circuits, (such as, for example, CPU's common in mainframe computers and minicomputers) or a single-chip microprocessor (such as the type common in personal computers). The present invention is intended to encompass data processing systems having any conventional CPU. The present invention also encompasses data processing systems having multiple CPUs.

Peripheral ports 16 through 22 are, for purposes of data processing system 10, ports or slots defining channels through which data is transferred between peripherals, such as input and/or output devices, and CPU 12. In many embodiments of the present invention, ports 16 through 22 appear to CPU 12 as one or more conventional memory addresses to which CPU 12 can send data and/or from which CPU 12 can receive data. In addition to providing such memory addresses for use by CPU 12, ports 16 through 22 also provide physical locations at which peripherals may be inserted or otherwise coupled to data processing system 10.

Peripheral ports 16 through 22 are used for illustrative purposes only, and it will be appreciated by those skilled in the art that the present invention is useful with any number of peripheral ports. In fact, the present invention is particularly useful with systems having a great number of peripheral ports. In such complex systems, it is more difficult for the user to locate specific peripherals or peripheral ports without detailed guidance.

Routing network 24 has a network memory (identified in FIG. 1 as a storage means) 26 for storing location information relating to the physical locations of ports 16 through 22, and a network controller (identified in FIG. 1 as a control means) 28, responsive to a location command, for reporting the location information. In many embodiments of the present invention, the location command is provided by CPU 12 in a conventional manner, and the location information is reported to CPU 12 using a conventional data communication protocol. It will be apparent to those skilled in the art that the present invention may be used with any conventional protocol or command type.

In many embodiments of the present invention, routing network 24 comprises a data bus 30, having a conventional set of hardware lines (traces or wires) used for data transfer among the components of data processing system 10 or among data processing system 10 and other computer hardware. Possible connection to other computer hardware is illustrated by arrows 32 at the ends of data bus 30. In such embodiments, peripheral ports 16 through 22 are coupled to data bus 30 through a bus adapter 34. Bus adapter 34 allows for separate communication between CPU 12 and each peripheral port.

The present invention also encompasses data processing systems having a routing network that includes more than one bus adaptor. In such systems, the routing network preferably has memory and a controller corresponding to each bus adapter.

Peripherals coupled to peripheral ports 16 through 22 may include I/O devices that transfer information to and/or from CPU 12. For purposes of the present invention, peripherals are not limited to I/O devices. Peripherals may also include devices that transfer information only to and/or from other peripherals, memory, or one or more CPUs. The present invention encompasses peripherals that are commonly used only for input, such as a keyboard, a mouse, a light pen, or a joystick. The present invention also encompasses peripherals that are commonly used only for output, such as a printer or a monitor, or peripherals, such as memory devices or I/O processors, that are commonly used for both data input and data output. In fact, for purposes of the present invention, a peripheral may comprise any board (also commonly called a card or an adapter) that expands, alters or adds to the functionality of CPU 12.

The present invention encompasses peripherals that occupy any number of peripheral ports. For example, a single I/O device may require more than one port. A peripheral port may also contain a card corresponding to more than one I/O device (such as a keyboard and a mouse) or more than one peripheral that does not perform I/O functions.

Figure 2:
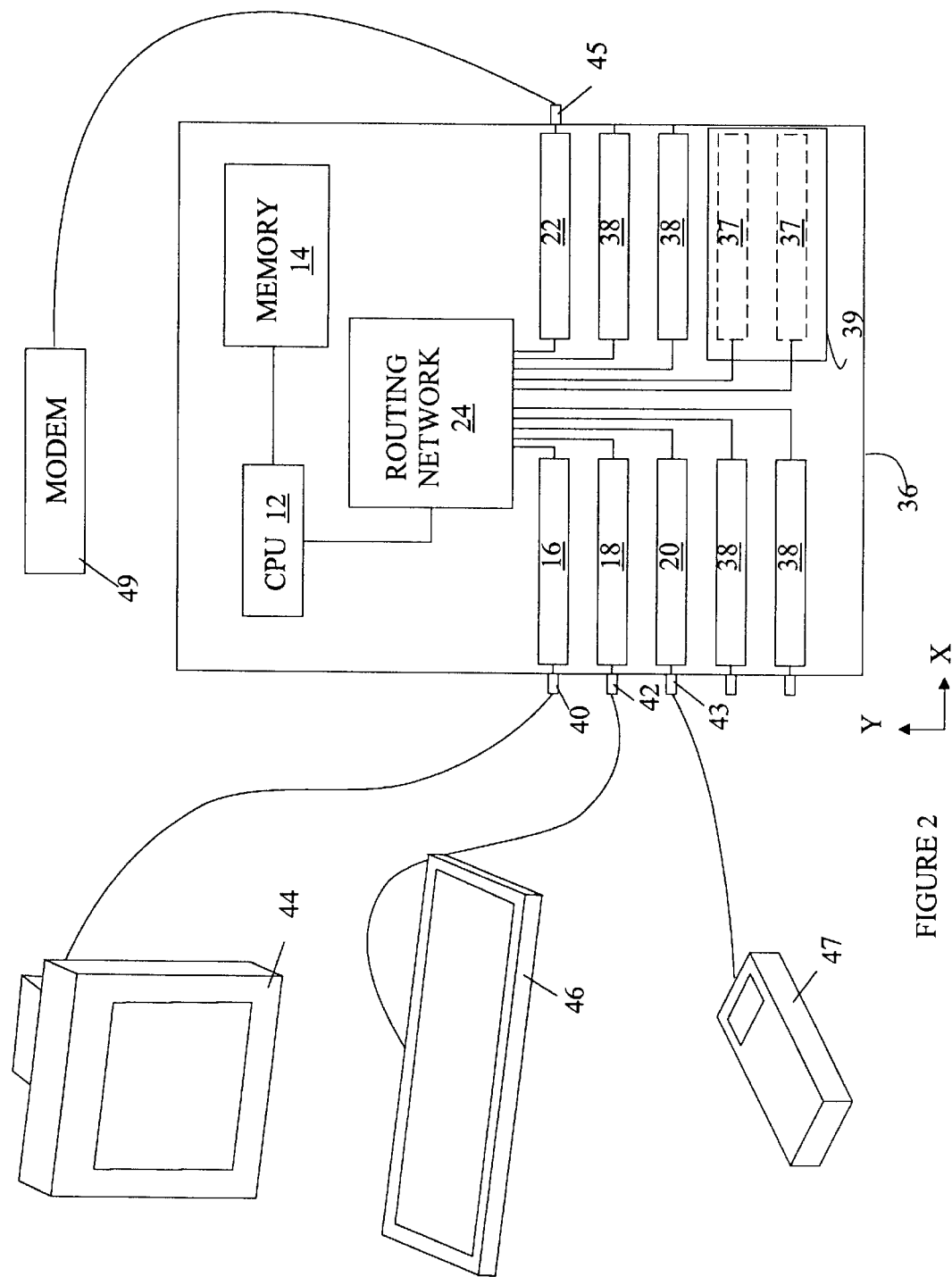
FIG. 2 is a diagram illustrating an exemplary physical arrangement of components of a data processing system.

One possible physical arrangement of peripheral ports 16 through 22 and other components of a data processing system according to the present invention is shown in FIG. 2. Peripheral ports 16 through 22 are shown in a casing 36, along with peripheral ports 37, and a plurality of other peripheral ports 38. The illustrated peripheral ports are each capable of being coupled to separate peripherals that occupy only a single port. In addition, ports 37 are also capable of being coupled jointly to a single peripheral.

Peripheral ports 16, 18, and 20 contain expansion boards (not shown) and are coupled through I/O ports 40, 42 and 43, respectively, to a monitor 44, a keyboard 46, and a mouse 47. Peripheral port 22 contains an expansion board (not shown) and is coupled through I/O port 45 to a modem 49. Peripheral ports 38 are unoccupied. Peripheral 39 occupies both expansion ports 37. For purposes of the present invention, peripheral 39 may be any peripheral that occupies two expansion ports. It will be appreciated by those skilled in the art that each of ports 37 is capable of being coupled to a separate peripheral, and that the ports are not limited to use with peripherals requiring two ports, such as peripheral 39.

To permit clarity in the drawing, the physical structure of many elements of data processing system 10 are not shown in FIG. 2. It will be understood by those skilled in the art that the elements of data processing system 10 not shown in FIG. 2 may be arranged in any conventional manner.

As explained above, peripheral ports 16 through 22 are identified and arranged for illustrative purposes only, and data processing systems according to the present invention may comprise any number of peripheral ports. Peripheral ports according to the present invention may be physically arranged in any way, either by themselves, or among and within other peripheral ports, as shown in FIG. 2. Peripheral 39, Monitor 44, keyboard 46, mouse 47, and modem 49 are used as exemplary peripheral devices, and it will be understood by those skilled in the art that any conventional peripherals may be used. The present invention also encompasses peripherals that occupy any number, type or arrangement of peripheral ports.

In operation, information relating to the physical locations of peripheral ports 16 through 22, 37 and 38 (as shown in FIG. 2) is stored in network memory 26 of routing network 24 (both shown in FIG. 1). In embodiments having the port arrangement shown in FIG. 2, for example, network memory 26 may store a description of the location of each port relative to the other ports or port locations in terms of vertical columns (along the y axis shown in FIG. 2) and horizontal rows (along the x axis shown in FIG. 2). Thus, for example, port 16 is defined as being in the first column and the first row of ports in casing 36, and such information is stored in storage means 26.

It will be understood by those skilled in the art that the location of the peripheral ports may be described in a wide variety of ways (including, for example, color coding of the ports), and that the present invention encompasses the storage of any information relating to the location of the ports. For example, due to the geometry of a particular computer system, certain ports may only accommodate single-port peripherals (peripherals designed to be coupled only to a single port) while other ports may accommodate single-port or multiple-port peripherals. Location information, therefore, may include information relating to the types of peripherals that may be accommodated in the ports.

Upon receiving a predetermined command from CPU 12, control means 28 causes this information stored in storage means 26 to be reported to the CPU. Software executing on the CPU causes an output device to deliver detailed information to the user concerning the location of the port. For example, the software may ask for the location of a damaged card. Upon receiving the information, the software generates a display showing the physical location of the card and instructions for replacing it. It will be recognized by those skilled in the art that, in the above described manner, generic software executing on CPU 12 is capable of obtaining a description of the physical location of ports and providing this description to the user by means of a conventional output device such as a video monitor or a printer. It will further be recognized by those skilled in the art that the present disclosure enables the development of a wide variety of software programs that utilize the teachings of the present invention, and report information to the user of a data processing system according to the present invention.

In the preferred embodiment of the present invention, peripherals coupled to ports 16 through 22 have a peripheral memory for storing peripheral information relating to physical characteristics of the peripheral, and a peripheral controller responsive to a peripheral command for reporting the peripheral information. Peripherals may also store peripheral information relating to the logical functions of the peripheral. For example, the peripheral may store information indicating that it relates to both a keyboard and a mouse. As another example, a peripheral which occupies more than one port may store information indicating which port or ports should be used to access each logical function. The peripheral information is preferably reported to the CPU, either directly or through network controller 28.

In operation, upon receipt of a command, peripherals report information relating to the physical and/or logical characteristics of the peripherals. Such information may include the number of ports occupied by the peripherals, the size of the peripherals, color-coding of the peripherals, symbolic information on the peripherals, or any other information relating to any physical characteristic of the peripherals.

To illustrate the operation of the preferred embodiment of the present invention, consider the case in which a peripheral located in peripheral port 22, which happens to be an expansion card for modem 49, becomes damaged. Diagnostic software executing on CPU 12 is used to determine the location of the damaged expansion card. The diagnostic software determines that the damage is related to peripheral port 22, which is identified as a conventional memory address to/from which CPU 12 sends/receives data for modem 49. Using a conventional data communication protocol, diagnostic software executing on CPU 12 sends a query to routing network 24, requesting information relating to the physical location of peripheral port 22. Controller 28 causes network memory 26 to send data to CPU 12 indicating that port 22 is located in the first row and second column of peripheral ports within casing 36. The diagnostic software reports this information to the user on monitor 44.

Also using a conventional data communication protocol, the diagnostic software executing on CPU 12 sends a query to the expansion card in port 22, requesting information relating to the physical description of the expansion card. A controller for the expansion card causes the expansion card memory to send data to CPU 12 indicating that the expansion card occupies a single port and is color coded with a red strip. The diagnostic software reports this information to the user on monitor 44.

By means of monitor 44, the diagnostic software directs the user to replace the card located in the first row and second column of peripheral ports that is color coded with a red strip. It will be appreciated by those skilled in the art that the diagnostic software may report information to the user in any conventional manner (such as, for example, by a printer) and that a monitor need not be used. The diagnostic software also provides the user with general instructions relating to replacement of a card. Armed with this information, a relatively unsophisticated user is enabled to replace the damaged card.

It will be appreciated by those skilled in the art that the present invention is not limited to diagnostic software that requests information from the hardware after a peripheral has failed. For example, certain software may obtain information concerning the peripherals and/or the ports when the software is initially installed, when peripherals are installed, or at any other time. Obtaining necessary information at installation is particularly useful in the case of a peripheral or port that is later damaged in a manner that prevents it from reporting information.

While the above-described embodiments of the present invention have been described in terms of the physical arrangement and functional blocks for an exemplary data processing system, it will be apparent to those skilled in the art, based on the foregoing description, that the present invention may be used with any other physical arrangement of peripheral ports and data processing systems having any other logical structure consistent with the following claims.

Various modifications to the present invention will become apparent to those skilled in the art from the foregoing description and accompanying drawings. Accordingly, the present invention is to be limited solely by the scope of the following claims.

What is claimed is:

1. A data processing system, having a predetermined configuration comprising:

a central processing unit for executing instructions stored in a memory;

a plurality of peripheral ports at a plurality of physical locations, wherein said physical locations are specified in terms of the location of the ports relative to the parameters of the predetermined configuration within the data processing system; and a routing network for coupling said central processing unit to said peripheral ports, said routing network having network storage means for storing location information specifying the physical locations of each of said ports coupled to said routing network, and control means responsive to a location command for reporting said location information to said central processing unit, wherein said location information is sufficient to specify the location of each of said peripheral ports without reference to any other information.

2. The data processing system of claim 1, wherein said peripheral ports define rows and columns, and the location of each of said peripheral ports is defined in terms of said rows and columns.

3. The data processing system of claim 1, further comprising a peripheral coupled to one of said ports, said peripheral having physical characteristics viewable by a user of said data processing system, said peripheral comprising:

peripheral storage means for storing peripheral information relating to said physical characteristics of said peripheral; and peripheral control means responsive to a peripheral command for reporting said peripheral information, wherein said peripheral information is sufficient to specify at least one of said physical characteristics without reference to any other information.

4. The data processing system of claim 3, wherein said peripheral information comprises information relating to the physical size of said peripheral.

5. The data processing system of claim 4, wherein the physical size of said peripheral is defined with respect to the vertical height and horizontal width of said peripheral, and said information relating to the physical size of said peripheral includes information relating to the vertical height and horizontal width of said peripheral.

6. The data processing system of claim 3, wherein said peripheral information comprises information relating to the physical appearance of said peripheral.

7. The data processing system of claim 6, wherein the information relating to the physical appearance of said peripheral includes information relating to the color of said peripheral.

8. The data processing system of claim 6, wherein said peripheral includes visible symbols and said information relating to the physical appearance of said peripheral includes information relating to the visible symbols of said peripheral.

9. The data processing system of claim 3, wherein said peripheral storage means is further for storing information relating to the function of said peripheral and said peripheral control means is further for reporting said information relating to the function of said peripheral.

10. The data processing system of claim 1, wherein said routing network comprises a bus.

11. A method for communicating information between a central processing unit and a plurality of peripheral ports at a plurality of locations, in a data processing system having as predetermined configuration, wherein said physical locations are specified in terms of the location of the ports relative to the parameters of the predetermined configuration within the data processing system comprising the steps of:

storing location information specifying the physical location of each peripheral port coupled to said central processing unit in an information storage device, wherein said location information is sufficient to specify the location of each of said peripheral ports without reference to any other information;

in response to a location command from the central processing unit, causing said information storage device to report said location information to said central processing unit.

12. The method of claim 11, wherein a plurality of peripherals are coupled to said peripheral ports, each said peripheral having physical characteristics viewable by a user of said data processing system, said method further comprising the steps of:

storing peripheral information relating to said physical characteristics of said peripherals in peripheral information storage device;

in response to a peripheral command from the central processing unit, causing said peripheral information storage device to report said peripheral information.

* * * * *

UNITED STATES PATENT AND TRADEMARK OFFICE
CERTIFICATE OF CORRECTION

PATENT NO.    : 5,826,103
DATED         : October 20, 1998
INVENTOR(S)   : Whittaker It is certified that error appears in the above-identified patent and that said Letters Patent is hereby corrected as shown below:

Column 8,
Line 28, delete "as" and insert therefor -- a --

Signed and Sealed this

Thirty-first Day of December, 2002

JAMES E. ROGAN
*Director of the United States Patent and Trademark Office*